(12) United States Patent
Keiya (10) Patent No.: US 11,256,417 B2
(45) Date of Patent: Feb. 22, 2022

(54) OPERATION INPUT CONTROL DEVICE (71) Applicant: SCHNEIDER ELECTRIC JAPAN HOLDINGS LTD., Tokyo (JP)

(72) Inventor: Osamu Keiya, Osaka (JP)

(73) Assignee: SCHNEIDER ELECTRIC JAPAN HOLDINGS LTD., Tokyo (JP)

( * ) Notice: Subject to any disclaimer, the term of this patent is extended or adjusted under 35 U.S.C. 154(b) by 0 days.

(21) Appl. No.: 17/279,881

(22) PCT Filed: Jun. 17, 2019

(86) PCT No.: PCT/JP2019/023926
§ 371 (c)(1),
(2) Date: Mar. 25, 2021

(87) PCT Pub. No.: WO2020/066156
PCT Pub. Date: Apr. 2, 2020

(65) Prior Publication Data
US 2021/0397340 A1 Dec. 23, 2021

(30) Foreign Application Priority Data
Sep. 26, 2018 (JP) .............................. JP2018-180833

(51) Int. Cl.
*G06F 3/0481* (2013.01)
*G06F 3/0488* (2022.01)

(52) U.S. Cl.
CPC ........ *G06F 3/04886* (2013.01); *G06F 3/0481* (2013.01)

(58) Field of Classification Search
CPC ..... G06F 3/04886; G06F 3/0481; G06F 3/048
See application file for complete search history.

(56) References Cited

U.S. PATENT DOCUMENTS

2015/0234551 A1* 8/2015 Yoshida ............... G06F 3/0488
715/768
2016/0004339 A1 1/2016 Koara et al.
(Continued)

FOREIGN PATENT DOCUMENTS

EP 1022650 A2 7/2000
EP 19864391.8 10/2021
(Continued)

OTHER PUBLICATIONS

International Preliminary Report on Patentability of PCT/JP2019/023926 dated Mar. 23, 2021 and English translation.
(Continued)

*Primary Examiner* — Jeanette J Parker
(74) *Attorney, Agent, or Firm* — Nixon & Vanderhye, PC (57) ABSTRACT

Display of a region for making a pointing operation valid or invalid is controlled in conjunction with a change to a display screen. A computer device (1) includes an application program execution processing section (31) configured to perform control such that at least one application window which accepts a pointing operation is displayed in a manner that allows the at least one application window to change in position or in size; and a region position control section (62) configured to generate an operation control region in such a manner that the operation control region is superimposed on the application window and is associated with the application window, the operation control region being a region for making a pointing operation valid or invalid, and to control a position of the operation control region such that the operation control region changes with a change to the associated application window.

7 Claims, 5 Drawing Sheets

(56) References Cited

U.S. PATENT DOCUMENTS

2018/0324351 A1 11/2018 Yoshimoto
2019/0065034 A1* 2/2019 Choi .................. G06F 3/04842

FOREIGN PATENT DOCUMENTS

| | | |
|---|---|---|
| JP | 7-225647 | 8/1995 |
| JP | 9-325859 | 12/1997 |
| JP | 10-171624 | 6/1998 |
| JP | 11-237978 | 8/1999 |
| JP | 2002-23905 | 1/2002 |
| JP | 2004-21596 | 1/2004 |
| JP | 2012-146257 | 8/2012 |
| JP | 2018-74455 | 5/2018 |
| WO | 2014-057814 | 4/2014 |
| WO | 2017/085983 A1 | 5/2017 |

OTHER PUBLICATIONS

International Search Report for PCT/JP2019/023926 dated Jul. 23, 2019.
European Search Report for Application No. 19864391.8 dated Oct. 5, 2021, 10 pages.

* cited by examiner

OPERATION INPUT CONTROL DEVICE

This application is the U.S. national phase of International Application No. PCT/JP2019/023926 filed Jun. 17, 2019 which designated the U.S. and claims priority to JP Patent Application No. 2018-180833 filed Sep. 26, 2018, the entire contents of each of which are hereby incorporated by reference.

TECHNICAL FIELD

The present invention relates to an operation input control device which makes valid or invalid a position input operation performed on a display screen.

BACKGROUND ART

Display screens such as windows provided by application programs or desktops (basic screens) provided by OSs have input regions which accept pointing operations. Pointing operations can be performed on these input regions by pointing the input regions with pointers indicated by input devices such as mice and touch panels.

For example, Patent Literature 1 discloses providing a touch invalid region around numeric keys on a screen. Such a touch invalid region is capable of preventing a cursor within a data setting region from being moved even if a touch accidentally falls outside the area of the numeric keys, provided that the touch falls within the touch invalid region.

CITATION LIST

Patent Literature

[Patent Literature 1]
Japanese Patent Application Publication Tokukaihei No. 9-325859 (Publication date: Dec. 16, 1997)

SUMMARY OF INVENTION

Technical Problem

Unfortunately, the technology disclosed in Patent Literature 1, in which the screen including the numeric keys and the touch invalid region is displayed in a fixed manner, does not enable change in the size of the screen or movement of the screen. Accordingly, the touch invalid region cannot be controlled in conjunction with the above windows or desktops, which are capable of being changed in size, moved, or displayed on a plurality of operation displaying devices.

It is an object of an aspect of the present invention to control, in conjunction with a change to a display screen, display of a region for making a position input operation valid or invalid.

Solution to Problem

To solve the above problem, an operation input control device in accordance with an aspect of the present invention includes a screen display control section configured to perform control such that at least one screen is displayed in a manner that allows the at least one screen to change in position or in size, and a region position control section configured to generate an operation control region in such a manner that the operation control region is superimposed on the screen and is associated with the screen, the operation control region being a region for making valid or invalid a position input operation performed on the screen, and to control a position of the operation control region such that the operation control region changes with a change to the associated screen.

Advantageous Effects of Invention

An aspect of the present invention enables controlling, in conjunction with a change to a display screen, display of a region for making a position input operation valid or invalid.

DESCRIPTION OF EMBODIMENTS

Embodiment 1

The following description will discuss an embodiment of the present invention with reference to FIGS. 1 to 5.

Figure 1:
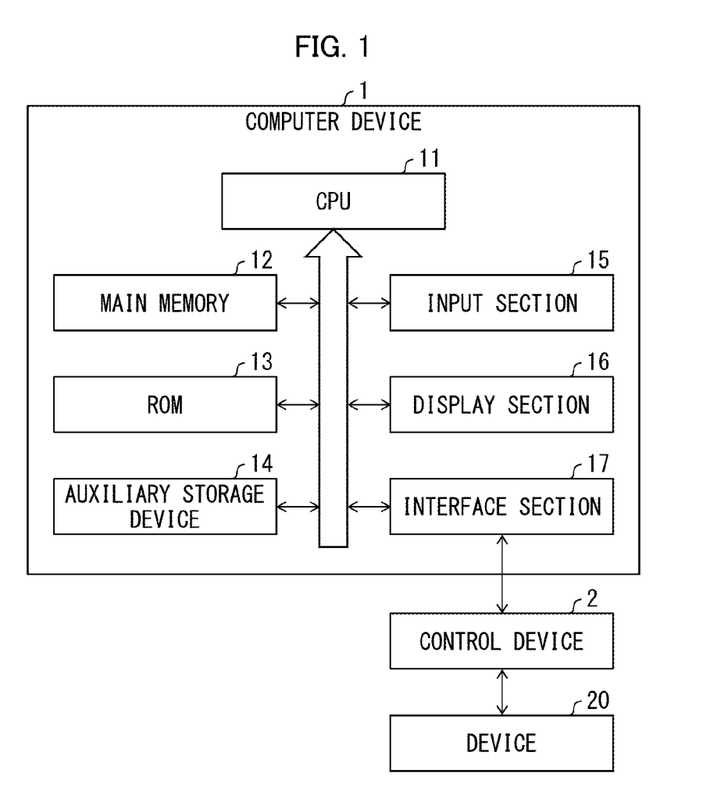
FIG. 1 is a block diagram illustrating a hardware configuration of a computer device in accordance with Embodiments 1 and 2 of the present invention.
Figure 2:
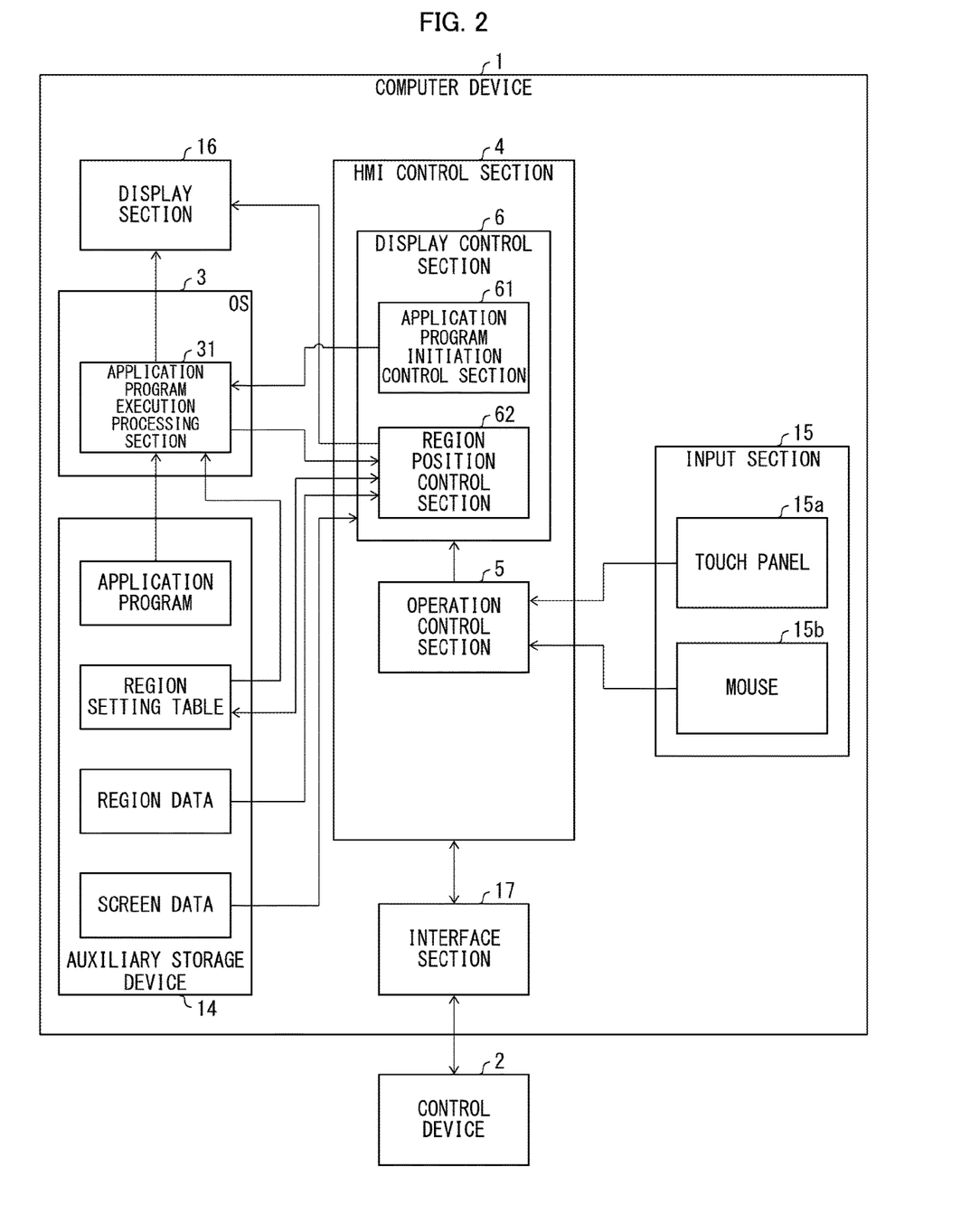
FIG. 2 is a block diagram illustrating a system configuration of the computer device.

FIG. 1 is a block diagram illustrating a configuration of a computer device 1 in accordance with the present embodiment. FIG. 2 is a block diagram illustrating a system configuration of the computer device 1.

The computer device 1 (operation input control device) has a universal Operating System (OS) implemented therein, and has a function of executing an application program. Examples of a device to be used as the computer device 1 include a personal computer, a work station, and an industrial computer. The industrial computer is a dedicated computer which has improved dust resistance, drip proofness, vibration resistance, and the like to adapt to harsh conditions in industrial plants and the like.

In the present embodiment, the computer device 1 is configured to not only execute a Human Machine Interface (HMI) application program to operate as an HMI device, but also execute other application programs. The HMI device includes a programmable display which monitors and controls a control target, a monitoring and controlling system such as a Supervisory Control And Data Acquisition (SCADA), and the like. The HMI application program is an application program which enables various functions which are carried out in an HMI device, such as communicating with an external device, displaying data obtained from the external device, and accepting an operation by an operator using an input device.

In the present embodiment, a computer resource (hereinafter referred to as a "resource") of the computer device 1 is a hardware resource of the computer device 1 that is used to execute an application program. The following description will discuss, in particular, a configuration in which a main memory 12 (described later), is focused on as the resource.

First, the hardware configuration of the computer device 1 will be described.

As illustrated in FIG. 1, the computer device 1 includes a Central Processing Unit (CPU) 11, a main memory 12, a Read Only Memory (ROM) 13, an auxiliary storage device 14, an input section 15, a display section 16, and an interface section 17.

The CPU 11 is a processing device which executes an application program. Specifically, when executing the application program, the CPU 11 receives data from the main memory 12, the auxiliary storage device 14, the input section 15, and the like, and performs computation or processing on the data, and then outputs the resultant data to the main memory 12, the auxiliary storage device 14, the display section 16, and the like.

The main memory 12 is a memory which constitutes the main storage device in the computer device 1, and composed of a Dynamic Random Access Memory (DRAM).

The ROM 13 stores programs essential to the operation of the computer device 1, such as the Basic Input Output System (BIOS) which is executed when the computer device 1 is powered up or reset.

The auxiliary storage device 14 is a mass storage device which stores an OS, an application program, various data, and the like, and is composed of a Hard Disc Drive (HDD), a Solid State Drive (SSD), and the like.

The input section 15 is used for an input operation by a user, and equipped with various input devices such as a touch panel, a mouse, and a keyboard.

The display section 16 is used to output image information which is generated within the computer device 1 while the OS and the application program are executed.

The input section 15 and the display section 16 may be devices that are incorporated into the computer device 1, or may be devices that are connected to the computer device 1 as external devices. Such an external device is connected to the computer device 1 via the interface section 17, which will be described next, to operate together with the computer device 1.

The interface section 17 is a connecting section for connecting the external device to the computer device 1 in the manner that allows communication between the external device and the computer device 1, and equipped with various interfaces including a serial interface. For example, the serial interface is connected to a control device 2 such as a Programmable Logic Controller (PLC), a temperature controller, and an inverter.

The following description will discuss the system configuration of the computer device 1. In the present embodiment, described is a system configuration for executing the HMI application program to cause the computer device 1 to operate as the HMI device, while executing other application program on the computer device 1.

As illustrated in FIG. 2, the computer device 1 has an operating system (hereinafter referred to as "OS") 3 implemented therein and is provided with an HMI control section 4. In addition, the computer device 1 is provided with a touch panel 15a and a mouse 15b as the input section 15 described above. Although the display section 16 is a component, such as a liquid crystal panel, incorporated into the computer device 1, the display device 16 may be a display device provided so as to be separate from the computer device 1. The touch panel 15a is disposed so as to overlap a display surface of the display section 16.

The OS 3 is a program which provides basic functions that are shared and used by application programs, such as management of the main memory 12, the ROM 13, the auxiliary storage device 14, the input section 15, the display section 16, and the interface section 17, which have been described above, and which manages the entire system of the computer device 1. Further, the OS 3 includes an application program execution processing section 31 which executes application programs.

The application program execution processing section 31 initiates and executes, of a plurality of application programs stored (saved) in the auxiliary storage device 14, an application program which has been designated to be initiated. In addition, the application program execution processing section 31 ends, of application programs being executed, an application program which has been designated to end.

An application program generates an application window (a screen) while being executed. When executing a plurality of application programs, the application program execution processing section 31 makes one of the application programs active (operable). In addition, the application program execution processing section 31 displays the application window of an active application program in the foreground of the display surface of the display section 16. Further, the application program execution processing section 31 (screen display control section) performs control such that at least one application window which accepts a pointing operation (position input operation) is displayed in a manner that allows the at least one application window to change in position or in size.

The HMI control section 4 is a Human Machine Interface function (HMI function) part which is implemented through execution of the HMI application program.

As used herein, the HMI function refers to a function that includes generating an instruction to the control device 2 in accordance with an input operation by a user, acquiring various data from the control device 2, and displaying the HMI screen for displaying the various acquired data and accepting the input operation. The HMI control section 4 has, as the HMI function, a communication function of communicating with the control device 2 via the interface section 17, and includes an operation control section 5 which controls individual sections on the basis of input of a user operation, and a display control section 6 which controls the display of the HMI screen.

The operation control section 5 generates an operation instruction in accordance with a position input operation (touch operation) through user's touch on the touch panel 15a. Examples of the operation instruction include an instruction for starting or stopping the control device 2, change of control data to be provided to the control device 2, and an initiation instruction for initiating an application program.

The display control section 6 performs processing of updating the HMI screen with the data from the control device 2 acquired via the interface section 17. For example, the display control section 6 performs processing of, on the HMI screen, turning on or off an object imitating a lamp, or displaying numerical values on an object imitating a numerical indicator. In addition, the display control section 6 performs processing of changing the state of the HMI screen in accordance with the above operation instruction. For example, the display control section 6 performs processing of changing the display state (for example, a color or a shape) of an object imitating a switch in response to an operation instruction for operating the object. Further, the display control section 6 performs processing of changing the HMI screen in accordance with a user operation.

In addition, the display control section 6 includes an application program initiation control section 61 (hereinafter referred to as an "AP initiation control section") and a region position control section 62.

The AP initiation control section 61 controls initiation of an application program through operation performed on the HMI screen displayed on the display section 16.

Specifically, the HMI screen is provided with an object imitating an initiation switch for initiating an application program (hereinafter referred to as an initiation switch). Further, when the initiation switch on the HMI screen is operated, the AP initiation control section 61 causes the application program execution processing section 31 to initiate an application program which is preset for the initiation switch.

Figure 3:
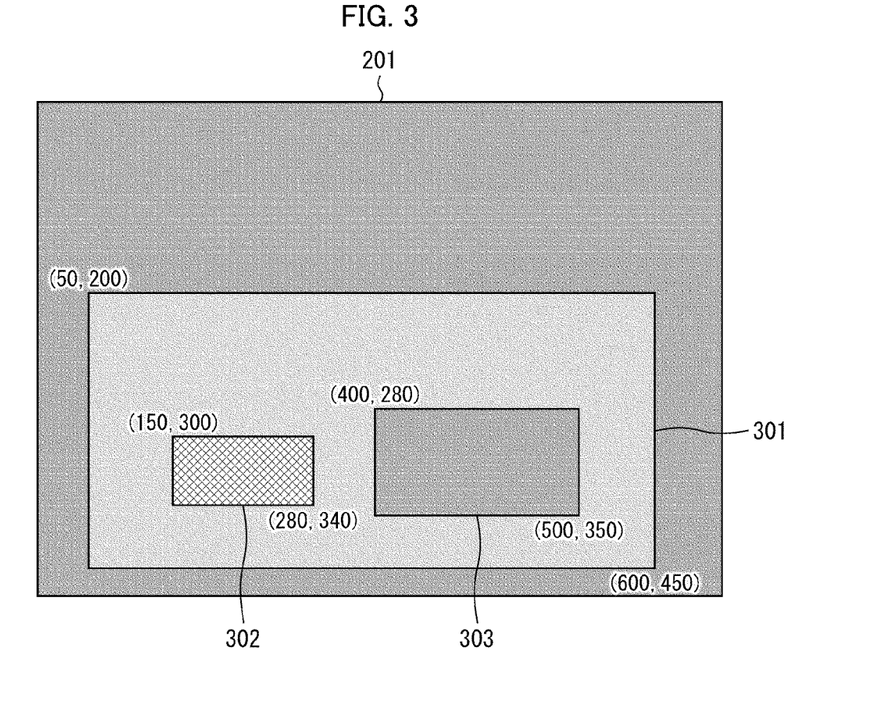
FIG. 3 is a view illustrating an arrangement of an operation control region in a window displayed by the computer device.

The region position control section 62 generates an operation control region for making valid or invalid an operation performed on the application window described above, and controls a position of the operation control region such that display of the operation control region changes with a change to its associated application window. The operation control region is a transparent window superimposed on the application window, and is associated with a particular application program. For example, on the application window 201, the operation control regions 301 to 303 are disposed in an overlapping manner, as illustrated in FIG. 3. The operation control region 301 is disposed on the application window 201, and the operation control regions 302, 303 are spaced side by side on the operation control region 301. The operation control regions 301 to 303 are each shaped into a rectangle.

Note that the arrangement positions, shapes, and settings of the operation control regions 301 to 303 are illustrated by way of example only, and are not intended to be limiting.

For example, settings for the operation control regions 301 to 303 are made, for the application program, as a region setting table illustrated in Table 1.

Specifically, the upper left coordinates and the lower right coordinates of the operation control regions 301 to 303 are set. For validity or invalidity of the touch operation, a setting can be selected from the following: 0: an always-invalidity setting, 1: a setting for switching between validity and invalidity through a specific operation (such as long pressing), and 2: a setting for switching between validity and invalidity in a certain period of time through a specific operation (such as long pressing).

As an activation setting for the operation control regions 301 to 303, either the following setting 0 or 1 is selected: 0: a setting for causing an application program not to turn active even when an operation is performed, or 1: a setting for turning an application program active when an operation is performed. A group number is a setting for specifying operation control regions which belong to the same group. The operation control regions belonging to the same group can be controlled in conjunction with each other.

TABLE 1

| | Application Program Name | Sample App |
|---|---|---|
| Operation Control Region 301 | Upper Left Coordinates | 50, 200 |
| | Lower Right Coordinates | 600, 450 |

TABLE 1-continued

| | Application Program Name | Sample App |
|---|---|---|
| | Validity/Invalidity Setting | 0 |
| | Activation Setting | 0 |
| | Group Number | 0 |
| Operation Control Region 302 | Upper Left Coordinates | 150, 300 |
| | Lower Right Coordinates | 280, 340 |
| | Validity/Invalidity Setting | 1 |
| | Activation Setting | 0 |
| | Group Number | 1 |
| Operation Control Region 303 | Upper Left Coordinates | 400, 280 |
| | Lower Right Coordinates | 500, 350 |
| | Validity/Invalidity Setting | 2 |
| | Activation Setting | 1 |
| | Group Number | 1 |

Although the region position control section 62 is incorporated in the display control section 6, such an example implementation of the region position control section 62 is not intended to be limiting. Alternatively, for example, it is possible to implement the function of the region position control section 62 through execution of a resident monitoring application program.

The following description will discuss how the computer device 1 configured as described above controls an operation performed on the application window using the operation control region.

Figure 4:
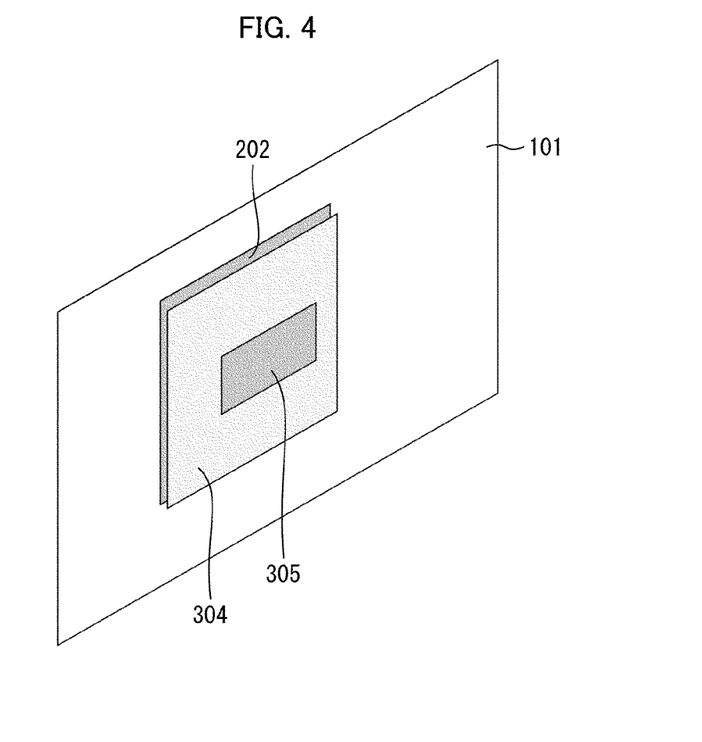
FIG. 4 is a view illustrating an example arrangement of an operation control region in an application window in accordance with Embodiment 1 of the present invention.
Figure 5:
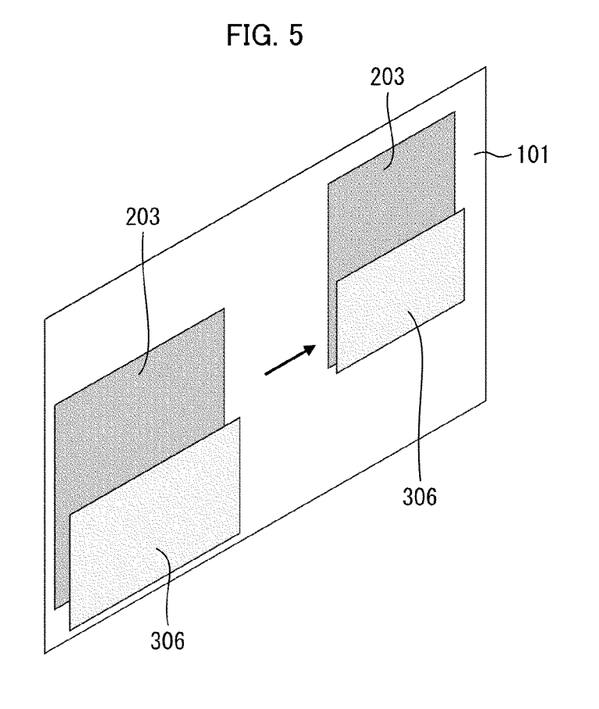
FIG. 5 is a view illustrating another example arrangement of the operation control region in the application window in accordance with Embodiment 1 of the present invention.

FIG. 4 is a view illustrating an example arrangement of operation control regions 304, 305 in an application window 202. FIG. 5 is a view illustrating an example arrangement of an operation control region 306 in an application window 203.

First, the display control section 6 causes the display section 16 to display an HMI screen (not illustrated) on the basis of screen data stored in the auxiliary storage device 14. The HMI screen is provided with an initiation switch for initiating an application program. An application program name is set for the initiation switch, and the arrangement information in the region setting table is associated with the initiation switch using this application program name.

When this initiation switch is operated with a touch, an initiation instruction for initiating a designated application program is generated, and the initiation instruction is given to the AP initiation control section 61. Upon receiving the initiation instruction, the AP initiation control section 61 initiates the application program having the application program name which is set in the region setting table.

The AP initiation control section 61 transfers, to the region position control section 62, display data for the application window generated by the initiation of the application program. The region position control section 62 refers to the region setting table stored in the auxiliary storage device 14 to acquire a set value including the coordinate values (upper left coordinates and lower right coordinates) of the operation control region. The region position control section 62 then creates, on the basis of the acquired information and the display data for the application window (window display data), combined display data with which the operation control region is displayed so as to be superimposed on the application window at a predetermined position. On the basis of the combined display data, the display section 16 displays, on the desktop which is a base screen, the application window on which the operation control region is superimposed.

For example, the application window 202 is displayed on a desktop 101 in the example illustrated in FIG. 4. In addition, the operation control regions 304, 305 are displayed so as to be superimposed on the application window 202. The operation control region 304 is a region for making invalid a touch operation performed on the application window 202. The operation control region 305 is provided within the operation control region 304, and is a region for making valid a touch operation performed on the application window 202.

In the example illustrated in FIG. 5, the application window 203 is displayed on the desktop 101. The operation control region 306 is displayed so as to be superimposed on the application window 203.

When the application window 203 is moved, through a user operation, in the direction to which the arrow in FIG. 5 points, the region position control section 62 acquires, from the application program execution processing section 31, a coordinate value (for example, an upper left coordinate value) of the application window 203 after the movement. The region position control section 62 obtains a movement distance of the application window 203 by calculating the difference between the coordinate value of the application window 203 which has been acquired, as the window display data, before the movement and the coordinate value of the application window 203 which is acquired after the movement.

In addition, the region position control section 62 calculates a coordinate value of the operation control region 306 after the movement by adding the movement distance of the application window to the coordinate value of the operation control region 306 in the region setting table, and updates the coordinate value in the region setting table to the calculated coordinate value. Further, the region position control section 62 generates display data for the operation control region 306 on the basis of the coordinate value after the movement, and creates combined display data by combining the display data and the window display data after the movement acquired from the application program execution processing section 31. The display section 16 displays, on the basis of the combined display data, the operation control region 306 which has moved in conjunction with the application window 203 after the movement, in such a manner that the operation control region 306 is superimposed on the application window 203 with the positional relationship between the operation control region 306 and the application window 203 remaining unchanged from that before the movement.

In a case where the application window changes in size through a user operation (in a case of scaling down or scaling up), the region position control section 62 acquires, from the application program execution processing section 31, a length of a diagonal line of the application window 203 (for example, a difference between an upper left coordinate value and a lower right coordinate value) after the size change. The region position control section 62 obtains a size change rate of the application window by calculating the ratio between a length of the diagonal line of the application window which has been acquired, as a window display data, before the size change and the above-described length of the diagonal line which is acquired after the size change.

In addition, the region position control section 62 calculates a coordinate value of the operation control region 306 after the size change by multiplying a length of the diagonal line of the operation control region which can be defined by the coordinate value in the region setting table (for example, the difference between upper left coordinates and lower right coordinates) by the size change rate of the application window. The region position control section 62 updates the coordinate value in the region setting table to the calculated coordinate value. Further, the region position control section 62 generates display data for the operation control region 306 on the basis of the coordinate value after the size change, combines the display data and a window display data after the size change acquired from the application program execution processing section 31 to create combined display data. The display section 16 displays, on the basis of the combined display data, the operation control region which has changed in size in conjunction with the application window 203 after the movement, in such a manner that the operation control region is superimposed on the application window with the positional relationship between the operation control region and the application window remaining unchanged from that before the size change.

As described above, the computer device 1 in accordance with the present embodiment includes the application program initiation control section 61 and the region position control section 62.

This enables a setting of validity or invalidity of a pointing operation by superimposing a plurality of operation control regions for respective application programs. Accordingly, it is possible to easily set a complicated input region. Further, it is possible to display the operation control region in such a manner that the operation control region is superimposed on the application window after movement or size change by moving the operation control region or changing the size of the operation control region in accordance with the movement or size change of the application window.

It is difficult for the HMI control section 4 to have a variety of functions, considering the size of the HMI program for implementing the functions of the HMI control section 4. For this reason, implementing functions such as a browser function, a video playback function, and a Portable Document Format (PDF) display function can need to rely on application programs. It is possible to minimize an operable range for an application window displayed as a result of executing an application program and associate the application window with the HMI screen by providing an operation control region to the application window. This allows a user to experience a sense of using the functions of the application program as part of the HMI function, and thus easily achieves a sense of unity of the HMI control section 4 and the application program.

As to gesture operations (such as pinch in, pinch out, and swipe), these operations can be made valid or invalid in accordance with a setting, in cases including a case where the operations are started in an operation control region for which a validity setting is made (a valid region) and a case where the operations end in the valid region. For example, a setting for making touch operations invalid and making gesture operations valid is made for a given operation control region. This allows, for example, an application window for a PDF viewer to be operated through a gesture performed as turning of the pages of a document, but prevents the scroll bar of the application window from being operated.

Although a screen on which the operation control region is superimposed is an application window in the present embodiment, a screen on which the operation control region is superimposed is not limited to an application window, and such a screen may be a desktop. In a case of a desktop, examples of a target in which touch operations are made valid or invalid include an icon. This applies to Embodiment 2, which will be described later.

Further, although the example in which a pointing operation is a touch operation performed on the touch panel 15a is described in the present embodiment, a target of a pointing operation is not limited to the touch panel 15a, and such a target may be the mouse 15b. This also applies to Embodiment 2, which will be described later.

Embodiment 2

Figure 6:
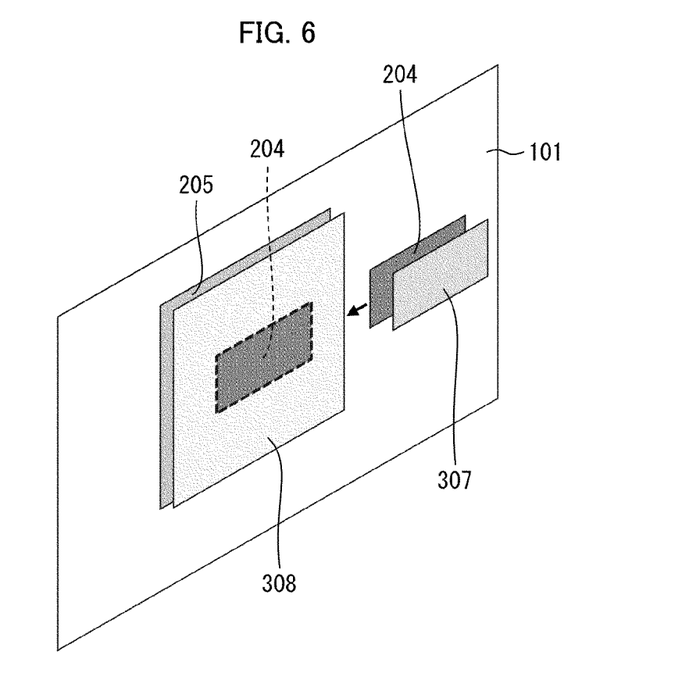
FIG. 6 is a view illustrating an example arrangement of an operation control region for an application window in accordance with Embodiment 2 of the present invention.
Figure 7:
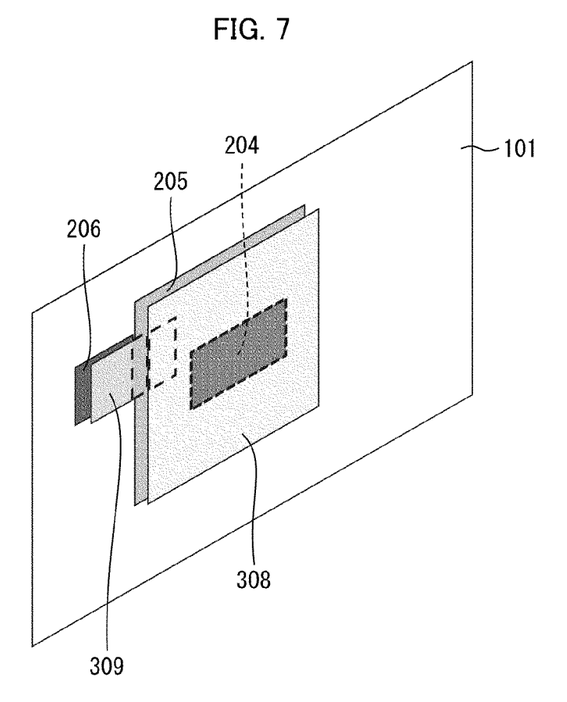
FIG. 7 is a view illustrating another example arrangement of the operation control region for the application window in accordance with Embodiment 2 of the present invention.

The following description will discuss Embodiment 2 in accordance with the present invention with reference to FIGS. 2, 6, and 7. It should be noted that, in the present embodiment, components having functions identical to those of the respective components described in Embodiment 1 are given respective identical reference signs, and a description of those components is omitted.

FIG. 6 is a view illustrating an example arrangement of operation control regions 307, 308 for application windows 204, 205. FIG. 7 is a view illustrating an example arrangement of operation control regions 308, 309 for application windows 204 to 206.

In the example illustrated in FIG. 6, the application windows 204, 205 are displayed on the desktop 101. In addition, the operation control regions 307, 308 are displayed so as to be superimposed on the respective application windows 204, 205.

In this state, when the application window 204 is moved behind the application window 205 and completely hidden by the application window 205, the region position control section 62 deletes the operation control region 307. Specifically, the region position control section 62 provides, to display section 16, display data in which display data only for the operation control region 308 is added to window display data for the application windows 204, 205 that is acquired from the application program execution processing section 31. The display section 16 displays, on the basis of the display data, only the image in which the operation control region 308 is superimposed on the application window 205.

This enables reduction in usage of a memory resource, and furthermore, eliminates the need for the process performed by the CPU 11 for monitoring the operation control region 307. This enables reduction in the load on the CPU 1.

In addition, also in a case where one operation control region associated with a screen is completely hidden by another operation control region located within the screen, the region position control section 62 deletes the one operation control region. The region position control section 62 may be designed not to create an operation control region in at least one of this case and the above-described case.

The display control section 6 determines, among application windows from the foreground application window to the background application window (or the desktop), an application window of which a display range a pointing position acquired from the input section 15 via the operation control section 5 falls within, in accordance with the arrangement order of each application window from the foreground application window. Whether the touch operation performed on the operation control region is valid or invalid is then determined in accordance with the setting, in the region setting table, for the application window (application program) of which the display range the pointing position falls within.

In the example illustrated in FIG. 7, an additional application window 206 is displayed on the desktop 101 with respect to the example illustrated in FIG. 6, and an operation control region 309 is displayed so as to be superimposed on the application window 206. The application window 206 and the operation control region 309 are partially hidden by the application window 205. Since the operation control region 309 has an exposed portion which is not hidden by the application window 205, it is determined whether a pointing position falls within the display range of the application window 206 as described above. This prevents the operation control region 309 from being deleted unlike the operation control region 307 completely hidden by the application window 205.

In a case where the above setting for turning an application program active is made for the operation control region 309, operating the exposed portion of the operation control region 309 with a touch switches the application window 206 active. In this switching, upon receiving data from the operation control section 5 which indicates detection of touch on the operation control region 309, the region position control section 62 confirms that the activation setting in the region setting table is "1". The region position control section 62 then instructs the application program execution processing section 31 to make active the application program which has created the application window 206.

Upon receiving the instruction, the application program execution processing section 31 makes the application program active. The region position control section 62 then acquires, from the application program execution processing section 31, window display data for the portion of the application window 206 that is hidden by the application window 205. Subsequently, the region position control section 62 generates display data for the hidden portion of the operation control region 309 and combines the display date and the acquired window display data to create combined display data. Consequently, the display section 16 displays the application window 206 in the foreground.

As described above, in the present embodiment, in a case where the setting for turning an operation control region active is made, the region position control section 62 does not make a touch operation invalid and performs processing for making the associated application program active even when a setting for the operation control region is such that any operation is invalid. This allows the application window partially hidden by another application window to be displayed in the foreground, regardless of whether a setting for the operation control region is a validity setting or an invalidity setting.

In a case where an invalid setting is made for the entire operation control region that has an exposed portion that is not hidden by another application window, even when the operation control region is touched, the application window on which the operation control region is superimposed is not typically displayed in the foreground. In contrast, the activation setting is considered as a setting for making valid only the action for displaying an application window in the foreground.

[Variation]

The following description will discuss variations of Embodiments 1 and 2.

The computer device 1 is applicable to a multi-display system in which a plurality of displays are connected via a LAN. The plurality of displays are constituted by a clone display and an extended display. The clone display displays the same image as the display section 16 of the computer device 1 does. The extended display can display an image different from the image displayed on the display section 16 of the computer device 1.

This enables the clone display to display an image in which an operation control region is provided on an application window, as with the image displayed on the display section 16, and enables the extended display to display an image in which another operation control region is provided on an application window other than the application window displayed on the display section 16. This makes it possible to limit an operation from another display. Therefore, it is possible for the multi-display system to have a simple interlock-like function.

The region position control section 62 may generate an operation control region for making invalid a touch operation performed on the start menu on the desktop, or an operation control region for making invalid a touch operation which falls within a specific range of the task bar on the desktop. In addition, the region position control section 62 may generate an operation control region for making invalid only the operation performed on the "x" button in the title bar of an application window for ending an application program.

This makes it possible to restrict initiation of an unnecessary application program generated on a desktop, or to prohibit an unexpected end of an application program.

In a case of running the application program for monitoring an operation state of a device, when displaying an application window which displays, in a list, data collected from the monitoring target device, the computer device 1 may restrict operation performed on the application window. Specifically, the region position control section 62 may generate an operation control region for making valid only the operation for scrolling the application window.

The computer device 1 may display an application window in such a manner that the application window is superimposed on the HMI screen. Examples of an application program for displaying such an application window include a PDF viewer, a tabulation application program, Supervisory Control And Data Acquisition (SCADA) program, and a ladder monitor program. The ladder monitor program is a program for monitoring the execution situation of a PLC ladder program.

This makes it possible to put restrictions on an operation performed on a variety of application programs. In addition, in a case where the computer device 1 is a device specialized for an industrial use (the device proof against, for example, dust, vibration, and water), combining the computer device 1 with the application program for Factory Automation (FA) enables establishment of a unique system.

When running some setting application program, the computer device 1 may restrict an operation performed on another application window displayed behind the application window of the setting application program. For example, the region position control section 62 may generate an operation control region for making invalid the operation performed the other application window until the setting ends.

This makes it possible to prevent the operation performed on the other application window from being done while the setting is not completed.

It is possible to restrict an input operation performed on an application window even in a case where the computer device 1 is a mobile terminal (such as a tablet and a portable PC). For example, when an application window which accepts pen input is displayed, the region position control section 62 may generate an operation control region for making invalid a touch operation performed on a region of the application window that is other than the region on which a pen input is operated.

This makes it possible to prevent the touch of a hand holding a pen on the region of the application window that is other than the region on which a pen input is operated from being accepted as an input operation.

A setting for making a pointing operation valid or invalid in accordance with the authority level of a user may be made for the operation control region. Further, the region position control section 62 controls, in accordance with the setting of the operation control region, whether to make valid or invalid the pointing operation performed on the operation control region.

This makes it possible to discriminate between acceptance and rejection of an operation performed on an application program in accordance with the authority level of a user who has logged in the computer device 1. For example, it is possible to make a setting such that a user having the highest authority level is allowed to operate all regions of the application window, and more operation invalid regions are provided in the application window for a user having a lower authority level.

Such a setting may be made for each application program. Alternatively, on the basis of the setting, an operation control region for making an operation invalid may be supervised for each user, or a user whose operation is made invalid may be supervised for each operation control region.

An action different from the valid-invalid action which makes valid or invalid a pointing operation performed on an operation control region may be set for the operation control region. Further, the HMI control section 4 (action performing section) may carry out an action which is set for the operation control region.

This enables, in response to a pointing operation, additional actions such as output of sound, output of a message, recording of an operation log (for example, a target application program, a user who has operated, an operation time) to be carried out. Any one of these actions may be carried out singly, or some of these actions may be carried out in combination.

A visual effect which makes it possible to determine whether a pointing operation is valid or invalid may be set for each operation control region. Further, the region position control section 62 may produce the set visual effect in the operation control region in accordance with whether the pointing operation performed on the operation control region is valid or invalid.

This makes it possible to let a user visually know whether a pointing operation performed on the operation control region is valid or invalid.

A visual effect with respect to an event different from a pointing operation may be set for the operation control region. Further, the region position control section 62 may generate the set visual effect in the operation control region when the event occurs.

This causes a visual effect associated with an event different from a pointing operation to generate in an operation control region when the event occurs in the operation control region. This makes it possible to easily notify a user, through a visual effect including a warning color such as red and a message, that an event which should be notified to the user, such as an alarm, has occurred.

The region position control section 62 may be designed to perform size change or movement of an operation control region through an operation by a gesture (such as pinch in, pinch out, and swipe).

This makes it possible to freely perform size change or movement of an operation control region. However, this could lead to mitigation of an operation restricting effect on an application program. To prevent the operation restricting effect from mitigating, a setting for making a touch operation valid or invalid in accordance with the level of authority of a user may be made.

In a case of initiating an application program in response to an operation performed on an initiation switch on an HMI screen, whether to apply the validity or invalidity setting for an operation control region in the region setting table may be determined.

This enables determination, based on an external operation, whether application of the validity or invalidity setting is necessary.

The region position control section 62 may control whether to make valid or invalid an operation performed on an operation control region by discriminating, among other position input operations, between an operation by means of the touch panel 15a (a touch operation) and an operation by means of the mouse 15b (a mouse operation). Specifically, the region position control section 62 discriminates between the operation by means of the touch panel 15a and the operation by means of the mouse 15b in view of the result of determination, made by the operation control section 5, which of the touch panel 15a and the mouse 15b is used for the operation.

This makes it possible, for example, to control, in accordance with a setting, whether to make valid or invalid an operation by means of the touch panel 15a, and, on the other hand, to make valid all operations by means of the mouse 15b.

[Summary of Embodiments]

The operation input control device (computer device 1) in accordance with an aspect of the present invention includes a screen display control section (application program execution processing section 31) configured to perform control such that at least one screen is displayed in a manner that allows the at least one screen to change in position or in size; and a region position control section 62 configured to generate an operation control region in such a manner that the operation control region is superimposed on the screen and is associated with the screen, the operation control region being a region for making valid or invalid a position input operation performed on the screen, to control a position of the operation control region such that the operation control region changes with a change to the associated screen.

With the above feature, the operation control region superimposed on the screen makes valid or invalid a position input operation performed on the screen, in a state in which the operation control region appears in the foreground of the screen. Further, when the screen changes through size or movement of the screen, the operation control region also changes with the change.

Optionally, the region position control section 62 of the operation input control device does not generate an operation control region in at least one of a case where the operation control region which is not associated with the screen is completely hidden by the screen, and a case where the operation control region which is associated with the screen is completely hidden by another operation control region located within the screen.

With the above feature, it is possible to release a resource used to generate and control an operation control region.

The operation control region of the operation input control device is a transparent window, and it may be possible, in the operation control region, to make a setting for making a position input operation valid or invalid or for switching a position input operation between validity and invalidity.

The above feature makes it possible to transparently provide an operation control region.

When a position input operation is performed on an exposed portion of the operation control region with the operation control region except the exposed portion being hidden by the screen with which the operation control region is not associated, the region position control section 62 of the operation input control device may perform control of display of the screen such that the screen with which the operation control region is associated appears in the foreground in accordance with a setting.

The above feature makes it possible to display, in the foreground, another screen behind a screen which is displayed in the foreground and make the other screen active in accordance with a setting by performing a pointing operation on an operation control region associated with the other screen. In a case where such a setting is not made, the other screen cannot be displayed in the foreground even when a pointing operation is performed.

A setting for making a position input operation valid or invalid is made for the operation control region of the operation input control device in accordance with the level of authority of a user, and the region position control section 62 may control, in accordance with the setting for the operation control region, whether to make valid or invalid the position input operation performed on the operation control region.

The above feature makes it possible to control, in accordance with the level of authority of a user, whether to make valid or invalid an operation performed on the operation control region. This enables appropriate discrimination between validity and invalidity of an operation performed on the operation control region.

A visual effect which allows determination whether to make a position input operation valid or invalid is set individually for the operation control region of the operation input control device, and the region position control section 62 may generate the set visual effect in the operation control region in accordance with whether the position input operation performed on the operation control region is valid or invalid.

The above feature makes it possible to easily determine, through a visual effect, whether a pointing operation performed on an operation control region is valid or invalid.

The region position control section 62 of the operation input control device may discriminate between, among position input operations, a touch operation and a mouse operation to control whether to make valid or invalid an operation performed on the operation control region.

The above feature makes it possible, for example, to control, in accordance with a setting, whether to make a touch operation valid or invalid, and, on the other hand, to make all mouse operations valid.

[Software Implementation Example]

A control block (in particular, the HMI control section 4) of the computer device 1 is realized by software.

The computer device 1 executes instructions of a program that is software realizing the foregoing functions. The computer device 1, for example, includes not less than one processor (the CPU 11) and a computer-readable storage medium storing the program. An object of the present invention can be achieved by the processor of the computer device 1 reading and executing the program stored in the storage medium.

Examples of the storage medium encompass a "non-transitory tangible medium" such as a read only memory (ROM), a tape, a disk, a card, a semiconductor memory, and a programmable logic circuit. The main memory 12 may be composed of a Random Access Memory (RAM) and the like in which the program is loaded. Further, the program can be made available to the computer via any transmission medium (such as a communication network or a broadcast wave) which allows the program to be transmitted.

Note that an aspect in accordance with the present invention cam also be achieved in the form of a computer data signal in which the program is embodied via electronic transmission and which is embedded in a carrier wave.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 computer device (operation input control device)
4 HMI control section (action performing section)
31 application program execution processing section (screen display control section)
62 region position control section
201 to 206 application window (screen)
301 to 309 operation control region

The invention claimed is:

1. An operation input control device comprising:
a screen display control section configured to perform control such that at least one screen is displayed in a manner that allows the at least one screen to change in position or in size; and
a region position control section configured to generate an operation control region in a form of a window in such a manner that the operation control region is superimposed on the screen and is associated with the screen, the operation control region being a region for making valid or invalid a position input operation performed on the screen, and to control a position of the operation control region such that the operation control region changes with a change to the associated screen, by calculating, in accordance with a degree of the change to the screen, coordinates of the operation control region which is associated with the changed screen.

2. The operation input control device according to claim 1, wherein the region position control section is configured not to generate the operation control region in at least one of a case where the operation control region which is not associated with the screen is completely hidden by the screen and a case where the operation control region which is associated with the screen is completely hidden by another operation control region located within the screen.

3. The operation input control device according to claim 1, wherein the operation control region is a transparent window, and it is possible to make a setting for making a position input operation valid or invalid or for switching a position input operation between validity and invalidity.

4. The operation input control device according to claim 1, wherein when a position input operation is performed on an exposed portion of the operation control region with the operation control region except the exposed portion being hidden by the screen with which the operation control region is not associated, the region position control section is configured to control display of the screen such that the screen with which the operation control region is associated appears in a foreground in accordance with a setting.

5. The operation input control device according to claim 1, wherein a setting for making a position input operation valid or invalid is made for the operation control region in accordance with a level of authority of a user, and
the region position control section is configured to control, in accordance with the setting for the operation control region, whether to make valid or invalid the position input operation performed on the operation control region.

6. The operation input control device according to claim 1, wherein a visual effect which allows determination whether to make a position input operation valid or invalid is set individually for the operation control region, and
the region position control section is configured to generate the set visual effect in the operation control region in accordance with whether the position input operation performed on the operation control region is valid or invalid.

7. The operation input control device according to claim 1, wherein the region position control section is configured to discriminate between, among position input operations, a touch operation and a mouse operation to control whether an operation performed on the operation control region is valid or invalid.

* * * * *